(12) United States Patent
Gurtler

(10) Patent No.: US 12,010,994 B2
(45) Date of Patent: Jun. 18, 2024

(54) ACIDULATED SURFACTANT COMPOSITIONS AND METHODS OF REDUCING MICROBIAL LOAD

(71) Applicants: The United States of America, as represented by the Secretary of Agriculture, Washington, DC (US); MANTROSE HAEUSER CO., INC., Lincoln, RI (US)

(72) Inventor: Joshua Gurtler, Phoenixville, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 150 days.

(21) Appl. No.: 16/567,487

(22) Filed: Sep. 11, 2019

(65) Prior Publication Data
US 2020/0093128 A1 Mar. 26, 2020

Related U.S. Application Data

(60) Provisional application No. 62/734,046, filed on Sep. 20, 2018.

(51) Int. Cl.
*A01N 37/36* (2006.01)
*A01N 25/30* (2006.01)

(52) U.S. Cl.
CPC ............ *A01N 37/36* (2013.01); *A01N 25/30* (2013.01)

(58) Field of Classification Search
CPC ......... C11D 7/265; C11D 3/2079; C11D 3/48; C11D 7/44; A01N 37/36; A01N 37/02; A01N 25/30; A23B 7/154
See application file for complete search history.

(56) References Cited

U.S. PATENT DOCUMENTS

| | | | | |
|---|---|---|---|---|
| 8,999,175 | B2 * | 4/2015 | Man ..................... | C11D 3/2079 210/759 |
| 2002/0039981 | A1 * | 4/2002 | Lopes ...................... | C11D 3/33 510/229 |
| 2004/0048755 | A1 * | 3/2004 | Lopes .................... | C11D 3/042 510/111 |
| 2009/0192231 | A1 * | 7/2009 | Lemons .................... | B08B 3/08 514/738 |

FOREIGN PATENT DOCUMENTS

| | | | | |
|---|---|---|---|---|
| CN | 107841389 A | * | 3/2018 | |
| MX | 2015017441 A1 | * | 6/2017 | |
| WO | WO-9937172 A1 | * | 7/1999 | ........... A23L 3/3463 |

* cited by examiner

*Primary Examiner* — John Pak
*Assistant Examiner* — Nathan W Schlientz
(74) *Attorney, Agent, or Firm* — John Fado; John T. Henri

(57) ABSTRACT

Compositions and methods for reducing microbial loads on agricultural products are disclosed. The compositions include at least one acidulant and at least one surfactant, each present in an effective amount to reduce a microbial load on an agricultural product. The methods include applying compositions of at least one acidulant and at least one surfactant to agricultural products to reduce microbial loads and cross contamination of agricultural processing equipment.

6 Claims, No Drawings

ACIDULATED SURFACTANT COMPOSITIONS AND METHODS OF REDUCING MICROBIAL LOAD

CROSS REFERENCE TO RELATED APPLICATION

This application claims priority to U.S. Provisional Patent Application Ser. No. 62/734,046, filed Sep. 20, 2018, the content of which is incorporated herein by reference in its entirety.

FIELD OF THE INVENTION

The disclosed invention relates generally to novel and improved compositions and methods to reduce microbial loads on agricultural products. More specifically, the invention relates to the utilization of environmentally friendly novel combinations of organic acids and surfactants to reduce microbial loads on agricultural products.

BACKGROUND OF THE INVENTION

Contamination of agricultural products with pathogens such as *Salmonella enterica, Listeria monocytogenes,* and Shiga toxin-producing *Escherichia coli*, among others, continues to be problematic. Such microbial contamination results in outbreaks of foodborne illnesses and costly recalls of agricultural products like fresh produce. For example, the U.S. Centers for Disease Control and Prevention data reveals that from 2004-2012 there were 134 illness outbreaks associated with fresh produce from foodborne bacteria alone (see e.g., Callejón, R. M., et al. (2015) *Foodborne Pathog. Dis.* 12:32-38). Problems associated with contaminated fruits and vegetables, means of preventing contamination, and multiple methods for decontamination have been extensively studied. Examples of agricultural products of interest include almonds, apples, blueberries, lettuces, bell peppers, tomatoes, strawberries, raspberries, leafy greens, alfalfa seeds, broccoli, radish seeds, spinach, parsley, pears, cantaloupes, sprouts, oranges, and cucumbers (see e.g., Cedric, N., et al. (2010) *Appl. Environ. Microbiol.* 12:2385-2397; Olaimat, A. N., et al. (2012) *Int. J. Food Microbiol.* 32:1-19).

Many antimicrobial agents have been tested for decontaminating foods, fresh produce rinse water, or hard surfaces. The use of chlorine in, for example, dump tanks or flume systems, in the treatment of fresh produce is very common. Chlorine, typically added in the form of sodium hypochlorite (NaClO), remains the most common adjuvant to dump tanks and flume systems for fresh fruits and vegetables. Nevertheless, a primary goal in the safety of fresh produce is not necessarily inactivation of foodborne pathogens on fresh produce itself, but rather the prevention of cross contamination of pathogens in dump tanks and flume systems. When using NaClO, however, organic matter such as latex and exudates from fresh produce or other soil contaminants quickly neutralize NaClO and its antimicrobial byproducts in wash waters. For this reason, other antimicrobial wash solutions that are resistant to organic matter in wash waters are needed.

Alternatives to chlorine are also being sought to increase safety and effectiveness as well to curb environmental concerns. For example, one alternative that has been used in wash waters by the fresh produce industry are peroxyacids, which are created chemically by combining hydrogen peroxide with one or more organic carboxylic acids. The most commonly used peroxyacid is peroxyacetic acid, or peracetic acid (PAA), which is created by the reaction between hydrogen peroxide and acetic acid, creating a new compound. Though also susceptible to organic matter, PAA has been used extensively for more than a century as a sanitizing solution and, more recently, PAA and other peroxyacids have been studied for use by the food industry as an adjuvant as dump tank and flume system treatments or as a general sanitizer for various human pathogens.

There thus exists an ongoing need to develop novel formulations that are safe and environmentally friendly to combat pathogenic microorganisms and cross contamination on agricultural products. There is a particular need to develop novel formulations and methods to combat microorganism growth on agricultural products in dump tanks and flume systems as well as for use in other systems and phases of agricultural production and distribution. These needs encompass preventing cross contamination of agricultural products in all phases of production and processing as well as inactivation of foodborne pathogens harbored on the agricultural products.

SUMMARY OF THE INVENTION

To address these challenging industrial needs, this invention accordingly provides new antimicrobial wash compositions for treating agricultural products such as whole or cut fresh fruits and vegetables to reduce microbial load. In an aspect, the invention includes aqueous compositions effective to reduce microbial loads present on agricultural products. The compositions include at least one acidulant and at least one surfactant. In another aspect, the invention includes methods of treating agricultural products to reduce microbial loads thereon.

It is an advantage of the invention to provide novel compositions and methods that are environmentally friendly and non-toxic to treat agricultural products against microbial contamination as well as the prevention of cross contamination.

It is another advantage of the present invention to provide new antimicrobial agricultural product washes and methods useful for their safety and efficacy in reducing microbial loads and/or inactivating pathogens.

It is a further advantage of the present invention to provide novel compositions and methods that may have a secondary benefit of pesticide and/or fertilizer residue removal.

It is yet another advantage of the present invention to provide novel compositions and methods using organic acidifiers and surfactants that are generally recognized as safe for the inactivation of bacterial contaminants and prevention of cross contamination on agricultural products.

This summary is provided to introduce a selection of concepts in a simplified form that are further described below in the detailed description. This summary is not intended to identify all key or essential features of the claimed subject matter, nor is it intended to limit the scope of the claimed subject matter.

DETAILED DESCRIPTION OF THE INVENTION

Unless defined otherwise, all technical and scientific terms used herein generally have the same meaning as commonly understood by one of ordinary skill in the art to which this invention belongs. The definitions herein described may or may not be used in capitalized as well as singular or plural form herein and are intended to be used as a guide for one of ordinary skill in the art to make and use the invention and are not intended to limit the scope of the claimed invention. Mention of trade names or commercial products herein is solely for the purpose of providing specific information or examples and does not imply recommendation or endorsement of such products.

As used in the description of the invention and the appended claims, the singular forms "a," "an," and "the" are intended to include the plural forms as well, unless the context clearly indicates otherwise.

The term "agricultural product" refers to edible farm-produced crops and goods including fruits, vegetables, nuts, legumes, grains, oats, etc. as well as cut, sliced, milled, pressed, etc. versions thereof and processed or manufactured products thereof from any origin (e.g., agricultural, horticultural, viticultural, forestry, etc.). For example, both whole tomatoes and sliced tomatoes, whole watermelon and portioned watermelon, whole grains, milled grains, etc. Fresh fruits and vegetables commonly referred to as "produce" in, for example, grocery stores or farmers markets, are also included in this description.

The term "consisting essentially of" excludes additional method steps or composition components that substantially interfere with the intended activity of the methods or compositions of the invention and can be readily determined by those skilled in the art (e.g., from a consideration of this specification or practice of the invention disclosed herein). This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms in alternative forms of the disclosed embodiments.

The term "effective amount" or "effective time" refers to such amount or time as is capable of performing the function(s) of the compositions or methods for which an effective amount or time is expressed. As is pointed out herein, the exact amount or time required will vary from process to process, depending on recognized variables such as the compounds employed and various internal and external conditions observed as would be interpreted by one of ordinary skill in the art. Thus, it is not possible to specify an exact "effective amount" or "effective time" though preferred ranges have been provided herein. An appropriate effective amount or time may be determined, however, by one of ordinary skill in the art using only routine experimentation.

The term "optional" or "optionally" means that the subsequently described event or circumstance may or may not occur, and that the description includes instances and embodiments in which said event or circumstance occurs and instances and embodiments where it does not. For example, the phrase "optionally rinsing the treated agricultural product" means that the treated agricultural product may or may not be rinsed and that this description includes methods that contain and do not contain a rinsing step.

The term "pathogen" refers to any microorganisms (e.g., bacteria, viruses, protozoa, etc.) that are of concern when present on agricultural products because of their propensity to cause harm to the agricultural products or that may cause harm or illness to consumers of the agricultural products.

The term "reduce microbial load" refers to reducing the contamination or number of microorganisms and/or pathogens present on an agricultural product or an equipment used to process agricultural products to an acceptable level (in some cases eliminating) that may otherwise harm the agricultural product and/or consumer of such agricultural product. Such reduction may occur, for example, by chemical removal or inactivation/destruction of the microorganisms and/or pathogens from the surface of the agricultural product or contamination within the wash waters in dump tanks or flume systems or other processing equipment.

The term "solution" refers to a composition in which the indicated ingredients are dissolved in the aqueous phase and excludes dispersions, for example, in which an indicated ingredient is present in a greater than saturation concentration whereby at least some of this ingredient is present as a dispersed solid. However, this term does not necessarily exclude non-dissolved non-indicated components including turbid wash water with dispersed solids when wash waters are recycled and reused.

The term "surface" refers to the layer, section, or portion of an agricultural product or agricultural processing equipment that would come into contact with the ambient environment or with a treatment applied to the agricultural product. For example, an outer layer would be the surface in the case of an entire tomato or an inner layer would be the surface in the case of a sliced tomato.

The term "treatment" or "treating" refers to any application or treatment using the disclosed composition that reduces microbial load or contamination on the surface of agricultural products or agricultural processing equipment.

In a preferred embodiment, the compositions of the invention include components that are generally recognized as safe at concentration levels effective against pathogens of interest to reduce microbial loads on agricultural products and/or equipment as well as prevent cross-contamination in systems where wash waters are recycled or reused. The composition of the invention includes at least one acidulant and at least one surfactant. These components are present in an effective amount to reduce a microbial load on an agricultural product and/or in applications related to agricultural equipment, for example, dump tanks or flume systems. The concentration and number of the particular components may vary depending on the application, as determined by a skilled artisan.

Suitable acidulants for the composition of the invention include organic acids. In embodiments, one or more organic acids are used as the acidulant for the inventive composition. The organic acids are selected from citric acid, lactic acid, isopropyl citrate (also known as citric acid isopropyl ester), tartaric acid, malic acid, benzoic acid, ascorbic acid, cinnamic acid, formic acid, fumaric acid, gluconic acid, levulinic acid propionic acid, sorbic acid, succinic acid, phenyllactic acid, gallic acid, octanoic acid, decanoic acid, hexanoic acid, nonanoic acid, the like, and combinations thereof. In a preferred embodiment of the composition, at least one acidulant is present in an amount ranging from about 0.025% to about 1.5%, or from about 0.15% to about 1.5%, or from about 0.1% to about 0.6%, or from about 0.16% to about 0.49%, or from about 0.16% to about 0.61%. It should be appreciated that the total amount used might be higher for combination of more than one acidulant. The acidulants may be used in combinations with equal proportions or any ratio. An amount of acidulant effective to reduce microbial load would vary with factors such as the cleanliness/turbidity of wash waters as well potential neutralizing effects of contaminants in the wash or rinse waters. Certain pathogens may also be strongly adherent to the surface of the agricultural products which may require higher concentrations for removal or inactivation.

In embodiments, the one or more surfactants present in the inventive composition are selected from sodium lauryl sulfate, glycerol monolaurate (monolaurin), sodium taurocholate, glycerol monooleate (monoolein), laurylaminopropionic acid, glycerol monostearate (monostearin), lecithin, polysorbate 80 (Tween® 80, polyoxyethylene (20) sorbitan monooleate), benzalkonium chloride, polysorbate 20 (Tween® 20), benzethonium chloride, glycerin monostearate, stearyltriethanolamine, Tween® 28 (ethoxylated sorbitan monolaurate), Tween® 81 (ethoxylated sorbitan ester), polysorbate 60 (polyoxyethylene (20) sorbitan monostearate), polysorbate 61, polysorbate 65 (polyoxyethylene (20) sorbitan tristearate), polysorbate 85, sorbitan monooleate, sorbitan monostearate, sorbitan trioleate, sorbitan tristearate, polyethylene glycol (PEG) 400 dioleate, PEG 600 dioleate, sodium-2-ethyl-hexyl sulfate, sodium dodecylbenzenesulfonate, the like, and combinations thereof. In a preferred embodiment of the composition, at least one surfactant is present in an amount ranging from about 0.01% to about 2.0%, or from about 0.015% to about 0.6%, or from about 0.02% to about 0.2%, or from about 0.05% to about 0.5%. It should be appreciated that the total amount used might be higher for combinations of more than one acidulant. The surfactants may be used in combinations with equal proportions or any ratio. An amount of surfactant effective to reduce microbial load would vary with factors such as the cleanliness/turbidity of wash waters as well potential neutralizing effects of contaminants in the wash or rinse waters. Certain pathogens may also be strongly adherent to the surface of the agricultural products which may require higher concentrations for removal or inactivation.

A commercial version of the inventive composition may be sold in a concentrated form or solid/powder form in certain embodiments. This form would be diluted and/or dissolved in water prior to use on the agricultural products or in a dump tank or flume system. For example, a concentrate containing all of the ingredients of the inventive composition as an antimicrobial wash to be made, in the same relative proportions can be made up in bulk, packaged in suitable containers, stored, shipped, and then diluted with a suitable amount of water (e.g., the concentrate may also be packaged with dilution or dissolution instructions) immediately before use. Any source of water may be utilized that is available at the point of use, including raw, tap, filtered, recycled, the like, and combinations thereof.

The composition of the invention when in a concentration range that is ready to use and apply to the agricultural products, equipment, and/or dump tanks and flume systems normally has a pH range from about 2.0 to about 3.0, or from about 2.25 to about 2.9, or from about 2.3 to about 2.8.

It should be understood that other compounds may be added to the inventive aqueous antimicrobial wash composition provided they do not substantially interfere with its intended activity and efficacy. To this end, whether or not such other compound(s) might interfere with the activity and/or efficacy of the inventive aqueous antimicrobial wash composition can be determined, for example, by the procedures utilized herein or with other testing procedures known by one of ordinary skill in the art. In certain embodiments, additional surfactants, organic acidulants, and/or inorganic acidulants might be added to the composition of the invention.

In embodiments, the invention provides methods of reducing a microbial load on an agricultural product. The methods include optionally pre-rinsing the agricultural product, for example, to remove dirt particles and water-soluble contaminants, and applying the disclosed composition to an agricultural product and leaving said composition on the agricultural product for an effective time to reduce a microbial load on the agricultural product and to produce a treated agricultural product. The treated agricultural product is optionally rinsed (e.g., with potable water or other washing agent) if desired to remove any residual antimicrobial wash composition still remaining on the agricultural product.

Any suitable application technique can be used for applying the inventive composition as an antimicrobial wash to agricultural products and agricultural equipment including spraying (e.g., direct spraying, misting, fogging, etc.), curtain coating, dump tanks, flumes, and the like. The composition preferably remains on the surface of the agricultural product for an effective time to inactivate microorganisms present on the agricultural product (e.g., on the surface of the agricultural product) to reduce the microbial load. Immersion coating has also been found especially useful. Regardless of the particular application technique used, the contact time during which the composition of the invention remains in contact with the agricultural product being treated is desirably about 1 to about 30 minutes, or from about 1 to about 20 minutes, or from about 1 to about 10 minutes, or from 2 to about 8 minutes, or from about 2 to about 5 minutes. The effective time of exposure needed to treat the target products might be adjusted or lengthened due to ambient conditions, degree of microbial presence, equipment contamination, or other factors as determined by a skilled artisan.

After treatment with the composition of invention and any optional rinsing step are completed, the treated agricultural product can be used in any conventional way. For example, the treated agricultural product can be packaged, stored, and shipped in accordance with normal practice. If so, the packaged produce, for example, is desirably stored at about 15° C. to about 25° C., or about 10° C. to about 15° C., or about 5° C. to about 10° C., or even about 2° C. to about 5° C. Alternatively, the treated produce can be frozen or dried in a conventional way. The treated agricultural product can also be treated in a conventional way, for example, with an antioxidant solution to prevent enzymatic discoloration before packaging.

In embodiments, the composition is applied to any surface of the agricultural product and may be applied once or a plurality of times throughout a cycle. The composition may be recycled into and with wash waters and be reused through a series of washes while present in the wash waters of a facility. The presence of the components could be periodically tested and determined to ensure proper concentration levels are maintained.

Thus, in this document, novel compositions and processes for treating agricultural products such as fresh fruits and vegetables to reduce microbial load or contamination particularly on the surface of the agricultural product being treated. The disclosed processes include contacting the surface of the agricultural product with the antimicrobial wash composition comprising an aqueous solution containing an effective or sufficient amount of at least one organic acid and at least one surfactant to reduce microbe contamination on the surface of the agricultural product being treated. In this connection, it should be appreciated that the application techniques typically used for applying antimicrobial washes to agricultural equipment and agricultural products such as fresh fruits and/or vegetables (e.g., direct spraying, misting, fogging, curtain coating, immersion, etc.) normally recycle the antimicrobial wash of the invention for reuse on many subsequent batches of the same type or different agricultural products.

In some cases, water washing agricultural products such as fresh produce is normally sufficient to remove microorganisms and pathogens from produce surfaces, even if the wash water contains no special antimicrobial agents. A problem commonly arises, however, when this wash water is reused because the microbes removed from fruits or vegetables remain in the recycled wash water where they rapidly increase and contaminate subsequent fruits or vegetables treated with the same wash water. For an antimicrobial wash to be effective in such processes in terms of reducing microbial contamination or load of multiple batches of fresh fruit or vegetables, the antimicrobial wash needs to contain enough antimicrobial agents to reduce the microbial contamination of this wash water over time. In general, it is therefore desirable to select the components and concentrations of such components in the ranges set forth herein. However, exact optimized concentrations can be determined by one of ordinary skill in the art by routine experimentation.

Preferably, the amount of inventive aqueous antimicrobial wash composition used as well as the concentrations of its active ingredients will be selected to avoid causing damage to the agricultural products being treated. Of course, the precise amount needed will vary in accordance with the particular compound or composition used, the agricultural product(s) to be treated, and the environment in which the agricultural products are located. The precise amount of the compound or composition can easily be determined by one skilled in the art given the teachings of this invention. For example, one skilled in the art could follow the procedures utilized herein to determine the amount of inventive aqueous antimicrobial wash composition to use as well as the concentrations of active ingredients therein to achieve a desired or statistically significant reduction in microbial load or contamination on agricultural product(s) of interest.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement. The following examples are intended only to further illustrate the invention and are not intended in any way to limit the scope of the invention as defined by the claims.

Example 1

This example illustrates an embodiment of the effectiveness of the inventive composition. Fourteen strains of Shiga-toxin producing enterohemorrhagic *E. coli* O157:H7 were tested for resistance to 20 ppm peracetic acid as well as against 1, 3, and 7% lactic acid (data not shown). The four most acid-resistant strains out of the fourteen were selected for use in this study. These four strains consisted of cattle isolate #'s 199, 758, 851, and 859, provided by Dr. T. G. Nagaraja (Distinguished Microbiology Professor, Kansas State University, Department of Veterinary Medicine). Five outbreak strains of *Listeria monocytogenes* were used, including L499, L502, L008, L2624, and L2625, provided by Dr. Bassam Annous (USDA-ARS-ERRC). Four serovars of *S. enterica* (*Salmonella* Newport H1275 (ERRC culture collection)), St. Paul 02-517-1 (cantaloupe outbreak), Stanley H0558 (CDC stool sample, 1995 sprout outbreak), and Montevideo G4639 (1993 tomato outbreak)) were also utilized. All isolates (except for the *L. monocytogenes* outbreak strains) were selected for spontaneous mutants resistant to 100 ppm of the antibiotic compound nalidixic acid (*L. monocytogenes* is naturally resistant to 100 ppm nalidixic acid and so was plated on media containing 100 ppm nalidixic acid without need for selection of spontaneous mutants). Isolates were individually incubated for 24 h at 37° C. in 10 mL of Tryptic Soy Broth (Difco, Sparks, MD)+100 ppm nalidixic acid (TSBN), as an antimicrobial marker and to preclude potential contamination on plates. Suspensions were centrifuged at 1980×g for 10 min, and resuspended in 5 ml of sterile deionized water and vortexed vigorously for 3 minutes. All strains of each individual species of bacteria were composited in a single sterile 500 mL beaker for inoculation of grape tomatoes.

*L. monocytogenes* was plated on Thermo Scientific™ Brilliance™ *Listeria* Agar (BLA, ThermoFisher Scientific, Fairlawn, NJ)+100 ppm nalidixic acid without the addition of BLA antimicrobial supplements+0.1% sodium pyruvate (to aid in recovering injured cells) (see e.g., Gurtler, J. B. & L. R. Beuchat, (2005) *Appl. Environ. Microbiol.* 71:7661-7669; Gurtler, J. B. & Kornacki, J. L. (2009) *Lett. Appl. Microbiol.* 49:503-509; Wesche, A. M., et al. (2009) *J. Food Prot.* 72, 1121-1138). *Salmonella* was plated on tryptic soy agar (Difco)+100 mg/L nalidixic acid+0.1% sodium pyruvate+80 mg/L X-α-Gal (5-Bromo-4-Chloro-3-indolyl-α-D-galactopyranoside) (Research Products Intl., Mt. Prospect, IL)+100 mg/L Isopropyl-β-D-thiogalactopyranoside (IPTG, Fisher Scientific). X-α-Gal induces a green color change by salmonellae colonies. *E. coli* O157:H7 was plated tryptic soy agar (Difco)+100 mg/L nalidixic acid+0.1% sodium pyruvate+175 mg/L red/salmon-Gal (6-Chloro-3-indolyl-β-D-galactopyranoside)+100 mg/L IPTG. Red/salmon-Gal induces a pink color change by *E. coli* colonies.

BS EN 1276 Test for Sanitizer Efficacy of Sodium Hypochlorite (NaClO). The British Standard, European Normalization Method 1276 for sanitizers was chosen to evaluate the efficacy low level NaClO. The level of free chlorine ranged from 10 to 48 ppm free chlorine, as tested with the LaMotte Model CL-BR 3624 titration kit (Chestertown, MD). The BS EN 1276 method as well as the French AFNOR NFT 72170 method has been traditionally used to evaluate sanitizer effectiveness (see e.g., Jacquet, C., and Reynaud, A. (1994) *Int. J. Food Microbiol.* 22:79-83; Taylor, J. H., et al. (1999) *Int. J. Appl. Microbiol.* 87:718-725). The BS EN 1276 method involves adding 0.03% bovine albumin to represent clean conditions and 0.3% albumin for dirty conditions. Briefly, 1 ml of either 0.03% or 0.3% bovine serum was added to a sterile 15 ml test tube, followed by 1 ml of the ca. 9 log CFU/ml test solution of each bacterial composite. The suspension was permitted to sit for 2 min and then 8 ml of an appropriately diluted NaClO solution was added to the 2 ml of bacteria-bovine solution suspension where concentrations of sanitizer solution were adjusted to mathematically account for the 2:8 dilution with the pathogen suspension at 10 ppm, 16 ppm, and 48 ppm. All tests were conducted at 22±1° C. The milieu was immediately vortexed and then vortexed again at the end of five minutes prior to extracting one ml and adding to 9 ml of DE broth. Samples were then plated, incubated at 37° C. for 24 h (48 h for *L. monocytogenes*) and enumerated. Comparative data from previous studies are shown in Table 1, which lists previous experimental studies with five types of produce treated with NaClO and free chlorine concentrations ranging from 10 to 600 ppm. The results were log reductions of *Salmonella, E. coli, Listeria monocytogenes*, coliforms or aerobic mesophilic bacteria between 0.5 to 2.0 log CFU when treated between 30 sec and ten min, with an average log reduction of 1.24 log CFU and an average treatment time of 5.42 min. The results of this examples are shown in Table 2 as log CFU/mL reduction which correlate with the previous study examples.

TABLE 1

| Produce | Author | Bacterium | Cl (PPM) | Time (min.) | Inactivation (Log CFU) |
|---|---|---|---|---|---|
| Lettuce (4° C.) | Zhang & Farber (1996) | L. monocytogenes | 200 | 10.0 | 1.3 |
| Lettuce | Kondo et al. (2006) | EHEC[a] & Salmonella | 200 | 10.0 | 1.2 |
| Lettuce | Kondo et al. (2006) | Aerobic Bacteria | 200 | 10.0 | 0.9 |
| Lettuce | Hellstrom et al. (2006) | L. monocytogenes | 100 | 1.0 | 0.7 |
| Lettuce | Nascimento et al. (2003) | Total Coliforms | 200 | 10 | <2.0 |
| Lettuce | Akbas and Oimez (2007) | L. monocytogenes | 100 | 5.0 | 1.7 |
| Lettuce | Simmons et al. (2006) | Aerobic Bacteria | 200 | 0.5 | 1.30 |
| Lettuce | Seymor et al. 2002 | E. coli | 100 | 10.0 | 0.72 |
| Lettuce | Li et al. (2001) | EHEC | 20 | 1.0 | 1.1 |
| Lettuce | Francis and O'Beime (2002) | Listeria innocua | 10 | 5.0 | 1.5 |
| Lettuce | Li et al. (2002) | L. monocytogenes | 20 | 0.5 | 1.2 |
| Lettuce | Koseki et al. (2001) | Aerobic Bacteria | 150 | 10 | 2.0 |
| Lettuce | Lu et al. (2007) | Aerobic Bacteria | 75 | 5 | 2.0 |
| Lettuce & Spinach | Niemera, 2007 | EHEC | 600 | 3.0 | 0.5 |
| Diced Tomato | Simmons et al. (2006) | Aerobic Bacteria | 200 | 0.5 | 0.00 |
| Parsley | Lapidot et al. (2006) | Salmonella | 100 | 5 | 1.7 |
| Lettuce | Koseki et al. (2003) | EHEC & Salmonella | 200 | 1.0 | ca. 1.0 |
| Cabbage/Parsley | Seymot et al. (2002) | E. coli | 100 | 10.0 | ca 1.45 |

[a]EHEC = E. coli O157:H7

TABLE 2

| | Bovine serum concentration | Free Chlorine Concentration | | |
|---|---|---|---|---|
| Bacterium | | 10 ppm | 16 ppm | 48 ppm |
| E. coli O157:H7 | 0.03% 0.3% | 0.64 B[a] ± 0.32[b] | 1.79 A ± 0.21 | 0.33 ± 0.47[c] |
| Salmonella | 0.03% 0.3% | 1.20 B ± 0.10 | 2.72 A ± 0.53 | 0.25 ± 0.25 |
| Listeria Monocytogenes | 0.03% 0.3% | 1.22 B ± 0.19 | 2.77 A ± 0.36 | 0.53 ± 0.21 |

[a]Log CFU/ml values in the same row not followed by a common letter are significantly different. Statistical separation of means was carried out by a post-hoc least significant difference t test.
[b]Means are followed by ± standard error of means.
[c]No statistical analyses were performed for the 48 ppm concentration results.

Acidulants citric acid (Sigma-Aldrich, St. Louis, MO), lactic acid (Acros Organics, ThermoFisher Scientific, Fairlawn, NJ), or isopropyl citrate (aka citric acid isopropyl ester; TCI America, Portland, OR) plus the GRAS surfactants sodium 2-ethylhexyl sulfate (S2-ES, Sigma-Aldrich, St. Louis, MO) and sodium dodecylbenzene sulfonate (Na-DOBS, Tokyo Chemical Industry Co., Tokyo, Japan) were also evaluated against E. coli, Salmonella, and L. monocytogenes in pure culture to test for sanitization effectiveness. The sodium dodecylbenzene-sulfonate preferably has alkyl group predominantly C12 and not less than 95% C10 to C16 to maintain favorable environmental characteristics. Acidulants were added, respectively, at final concentrations of between 0.1 and 0.55% (w/v), while surfactants were added in combination at final concentrations of 0.025% (w/v). Briefly, 1 ml of the ca. 9.6 log CFU/mL test solution of each bacterial composite was added to a 15 ml test tube and 9 ml of the acidified antimicrobial+surfactants wash solution was added to the suspension where concentrations of tested sanitizer were adjusted to mathematically account for the 1:9 dilution with the pathogen suspension to achieve the concentrations shown in Table 3. All tests were conducted at 22±1° C. The milieu was immediately vortexed and then vortexed again at the end of two minutes prior to extracting one ml and adding to 9 ml of DE broth. Samples were then plated, incubated at 37° C. for 24 h (48 h for L. monocytogenes) and enumerated. The results are shown in Table 2 as reduction in log CFU/g. The BS EN 1276 method was used above to test the chlorine solutions in the presence of organic matter, which generally requires 5 min. of holding time, according to the stated protocol. The composition of the invention was tested in this example for only for 2 min. because that is usually the maximum amount of time provided for washing agriculture products in the fresh produce industry.

TABLE 3

| Treatment | Bacterium | | | pH values |
|---|---|---|---|---|
| | Salmonella | E. coli O157:H7 | L. monocytogenes | |
| 0.55% Citric acid + 0.025% NaDobs + 0.025% S2-ES | ≥6.61 ± 0.15[a] A[b] | ≥6.28 ± 0.26 AB | ≥6.60 ± 0.40 AB | 2.28 |
| 0.45% Citric acid + 0.025% NaDobs + 0.025% S2-ES | ≥6.61 ± 0.15 A | ≥6.38 ± 0.44 AB | ≥6.99 ± 0.07 A | 2.36 |
| 0.35% Citric acid + 0.025% NaDobs + 0.025% S2-ES | ≥6.61 ± 0.15 A | ≥6.60 ± 0.22 AB | ≥6.99 ± 0.07 A | 2.44 |

TABLE 3-continued

| Treatment | Bacterium | | | pH values |
|---|---|---|---|---|
| | Salmonella | E. coli O157:H7 | L. monocytogenes | |
| 0.55% Lactic acid + 0.025% NaDobs + 0.025% S2-ES | ≥6.61 ± 0.15 A | ≥6.80 ± 0.02 A | ≥7.00 ± 0.07 A | 2.33 |
| 0.45% Lactic acid + 0.025% NaDobs + 0.025% S2-ES | ≥6.61 ± 0.15 A | ≥6.33 ± 0.46 AB | ≥6.99 ± 0.07 A | 2.46 |
| 0.35% Lactic acid + 0.025% NaDobs + 0.025% S2-ES | ≥6.61 ± 0.15 A | ≥6.80 ± 0.02 A | ≥6.99 ± 0.07 A | 2.44 |
| 0.49% Isopropyl citrate + 0.025% NaDobs + 0.025% S2-ES | ≥6.54 ± 0.02 A | ≥6.73 ± 0.04 AB | ≥7.00 ± 0.07 A | 2.38 |
| 0.38% Isopropyl citrate + 0.025% NaDobs + 0.025% S2-ES | ≥6.54 ± 0.02 A | ≥6.77 ± 0.01 A | ≥7.00 ± 0.04 A | 2.44 |
| 0.27% Isopropyl citrate + 0.025% NaDobs + 0.025% S2-ES | ≥6.54 ± 0.02 A | ≥6.50 ± 0.37 B | ≥7.00 ± 0.04 A | 2.69 |
| 0.16% Isopropyl citrate + 0.025% NaDobs + 0.025% S2-ES | 5.27 ± 0.51 B | 4.38 ± 0.54 C | ≥7.00 ± 0.04 A | 2.83 |

$^a$Mean values ± standard error.
$^b$Log CFU/ml values in this same column not followed by a common letter are significantly different.
Statistical separation of means was carried out by a post-hoc least significant difference t test.

Grape tomatoes were inoculated by the method described in Moore-Neibel, K., et al. (2011) *J Appl. Microbiol.* 112: 485-492, with minor modifications. Tomatoes that were 10.0±1.5 g in mass were utilized for this study. Three tomatoes were dip-inoculated in each pathogen, respectively, and placed on sterile racks in a laminar flow hood for 1 h. The inoculated tomatoes were then placed in either 100 ml of sterile water (positive control) or 100 ml of representative concentrations of the stir-bar-mixed acidified antimicrobial solution for 2 min. Samples (i.e., three tomatoes for each acidified antimicrobial solution) were then removed, individually placed in sterile Whirl-Pak stomacher bags (Nasco, Atlanta, GA), with an equivalent amount (weight: volume) of DE broth (e.g. for 30 g of tomato, 30 ml of DE broth would be added), crushed by hand and then pummeled for 120 s in a Seward stomacher 400 (Seward Ltd., West Sussex, U.K.). Samples were then plated, incubated at 37° C. for 24 h (48 h for *L. monocytogenes*) and enumerated for reduction in log CFU/g (amount of inoculum per g weight of tomato). Results are shown in Table 4 along with a positive control of 50 ppm chlorine. A surprising and unexpected reduction was observed for the composition of the invention as compared to the chlorine control.

TABLE 4

| Treatment | Bacterium | | | pH Values |
|---|---|---|---|---|
| | Salmonella | E. coli O157:H7 | L. monocytogenes | |
| 0.61% Citric acid + 0.025% NaDobs + 0.025% S2-ES | 4.90 ± 0.15$^a$ A$^b$ | 4.37 ± 0.36 A | 3.35 ± 0.40 AB | 2.27 |
| 0.61% Lactic acid + 0.025% NaDobs + 0.025% S2-ES | 4.83 ± 0.15 A | 4.19 ± 0.59 AB | 3.98 ± 0.07 AB | 2.27 |
| 0.54% Isopropyl citrate + 0.025% NaDobs + 0.025% S2-ES | 5.47 ± 0.15 A | 4.85 ± 0.38 A | 4.19 ± 0.07 A | 2.29 |
| Deionized water | 1.61 ± 0.21 B | 2.31 ± 0.50 C | 1.90 ± 0.06 C | |
| 50 ppm chlorine | 2.60 ± 0.25 B | 2.92 ± 0.38 BC | 3.16 ± 0.61 B | 9.88 |

$^a$Mean values ± standard error.
$^b$Log CFU/ml values in this same column not followed by a common letter are significantly different.
Statistical separation of means was carried out by a post-hoc least significant difference t test.

Three independent experimental research trials were conducted for each inactivation study shown in the Tables above. Samples from each experimental trial were transformed to log 10 values, and means were determined. Data were analyzed by ANOVA, and significant differences ($p<0.05$) in the reduction of *E. coli* O157:H7, *Salmonella*, or *L. monocytogenes* between treatments were determined by the post hoc least significant difference t-test via SAS version 9.1 (SAS Institute, Inc., Cary, NC).

The superiority of peroxyacids over chlorine in the presence of organic matter, where chlorine tends to be neutralized in the presence of organic matter has been studied (see e.g., Cords, B. R., et al. (2005) Sanitizers: Halogens, Surface-Active Agents, and Peroxides, p. 507-572. In P. M. Davidson, J. N. Sofos, and A. L. Branen (ed.), Antimicrobials in food, 3$^{rd}$ ed. CRC Taylor and Francis, Boca Raton, FL; Fatemi, P. and J. F. Frank (1999) *J. Food Prot.* 62:761-765). It is commonly known that chlorine levels drop below target concentrations in industrial wash tank conditions. In the examples above, it was observed that the typically maximum encountered chlorine concentration of 48 ppm inactivated less than 0.76 log of *S. enterica, L. monocytogenes* or *E. coli* O157:H7 after 5 min in the presence of 3% bovine albumin (i.e., simulating dirty conditions); whereas, lesser concentrations of 10 to 16 ppm of free chlorine inactivated only 0.64 to 2.77 log of *S. enterica, L. monocytogenes* or *E. coli* O157:H7 after 5 min in the presence of only 0.3% bovine albumin (i.e., simulating clean conditions—which would be a best-case-scenario under clean industrial dump tank or flume system settings). Chlorine is demonstrably inferior at inactivating these microbes under both clean and dirty conditions.

While a major goal of fresh produce sanitizers is to prevent cross contamination by decontaminating wash waters, a second goal is to inactivate pathogens from already-contaminated produce. It is known that peroxyacid combinations (including peroxylactic acid) to be superior to chlorine in water and on lettuce leaves when compared with chlorine (see e.g., Lin, C., et al. (2002) *J. Food Prot.* 65:1215-1220; Zhang, G., et al. (2009) *J. Food Prot.* 72:1392-1397), and it was also found that found mixed peroxyacids significantly reduce the presence of spoilage causing molds on fresh fruits and vegetables (see e.g., Hilgren, J. D., and Salverda, J. A. (2000) *J. Food Sci.* 65:1376-1379). Peroxylactic solution was also tested and found capable of inactivating 2.71 and 2.95 log CFU of *Salmonella* and *E. coli* O157:H7 on stem scars of tomatoes as well as on dip-inoculated strawberries, respectively (see e.g., Gurtler, J. B., et al. (2012) *Int. J. Food Microbiol.* 159:84-92; Gurtler, J. B., et al. (2014) *Int. J. Food Microbiol.* 139:113-118). This level was greater than 6.44 pH-adjusted free chlorine (198 ppm), which inactivated only 1.86 log CFU of *Salmonella* and *E. coli* O157:H7 on strawberries. This value was also greater than the 1.53 log (200 ppm free chlorine) and 1.1 log (200 ppm NaOCl) inactivation of pathogens by pH-unadjusted chlorine on tomato stem scars (*Salmonella* and *E. coli* O157:H7) and (see e.g., Alexandre, E. M. C., et al. (2012) *Food Control.* 27:362-368) on watercress (total coliforms), respectively.

The combination of 0.5% lactic or caprylic acid or 0.3% levulinic acid plus 0.05% sodium dodecyl sulfate was found to inactivate 7.2 log CFU/ml of *Salmonella enterica* in pure culture (see e.g., Zhao, T., et al. (2009) *J. Food Prot.* 72:928-936). In the present invention, the disclosed composition was found to completely and surprisingly inactivate a four-strain composite of salmonellae as well as other bacteria as shown in Table 3 in pure culture (i.e., ≥6.54 log CFU/ml).

Reductions of pathogens on grape tomatoes using the disclosed combination of acidulants and surfactants of the invention for two minutes were surprising and as high as ca. 5.47, 4.89, and 4.19 log CFU/fruit at 0.54% concentration of isopropyl citrate plus 0.025% and 0.025% of each of the two preferred surfactants for *Salmonella, E. coli* O157:H7 and *L. monocytogenes*, respectively. This reduction was surprisingly and significantly greater than citric acid and lactic acid washes for *Listeria*, although all antimicrobial washes achieved significantly greater reductions than sterile deionized water washes alone, which were 1.61, 2.31, and 1.90 log CFU/g fruit for *Salmonella, E. coli* O157:H7 and *L. monocytogenes*, respectively. These numbers are greater than those reported with chlorine in Table 1 on various types of produce, which averaged a 1.24 log CFU reduction with an average of 154.2 ppm of free chlorine, washed for an average of 5.42 min.

These results demonstrate that these combinations of acidulants and surfactants may be an effective choice for preventing cross-contamination during the washing of agricultural produce as well as reducing pathogens thereon. The antimicrobial produce wash of the invention may provide an alternative to the use of chlorine for dump tank and flume system treatment or spray-washing of fresh produce, and also for preventing the cross contamination of *S. enterica, L. monocytogenes*, and *E. coli* O157:H7 to treated produce. Future studies may investigate the reduction of pathogens on other produce commodities by this combination of acidulants+surfactants as well as their ability to disrupt and decontaminate biofilms.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety, including any materials cited within such referenced materials. Furthermore, the invention encompasses any possible combination of some or all of the various embodiments and characteristics described herein and/or incorporated herein. In addition, the invention encompasses any possible combination that also specifically excludes any one or some of the various embodiments and characteristics described herein and/or incorporated herein.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 30%, preferably by as much as 20%, and more preferably by as much as 10% to a reference quantity, level, value, or amount.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims. Although any methods and materials similar or equivalent to those described herein can be used in the practice or testing of the present invention, the preferred methods and materials are herein described. Those skilled in the art may recognize other equivalents to the specific embodiments described herein which equivalents are intended to be encompassed by the claims attached hereto.

We claim:

1. A method of reducing a microbial load on an agricultural product, the method comprising: applying a wash aqueous solution to the agricultural product, wherein the wash aqueous solution consists of:
   a) isopropyl citrate in the wash aqueous solution in a concentration range of about 0.025-1.5% w/v;
   b) surfactant in the wash aqueous solution consisting of sodium 2-ethylhexyl sulfate, and sodium dodecylbenzene sulfonate each in a concentration range of about 0.01-2% w/v; and
   c) water; and leaving said wash aqueous solution on the agricultural product for an effective amount of time to reduce a microbial load on the agricultural product to produce a treated agricultural product, and optionally rinsing the treated agricultural product.

2. The method of claim 1 further comprising pre-rinsing the agricultural product to provide a rinsed agricultural product and optionally drying the rinsed agricultural product.

3. A method of reducing bacterial pathogens on agricultural products comprising: treating an agricultural product with an aqueous solution consisting of:
   isopropyl citrate in a concentration range of about 0.025-1.5% w/v,
   a surfactant consisting of sodium 2-ethylhexyl sulfate in a concentration range of about 0.01-2% w/v,
   sodium dodecylbenzene sulfonate in a concentration range of about 0.01-2% w/v, and water, wherein the treating step is for an effective time to reduce bacterial pathogens.

4. The method of claim 3 wherein the pathogens are *Salmonella, Escherichia Coli* and/or *Listeria*.

5. The method of claim 3 wherein the effective time to reduce bacterial pathogens is at least two minutes.

6. An aqueous solution for reducing bacterial pathogens consisting of:
   isopropyl citrate in a concentration range of about 0.025-1.5% w/v,
   a surfactant consisting of sodium 2-ethylhexyl sulfate in a concentration range of about 0.01-2% w/v,
   sodium dodecylbenzene sulfonate in a concentration range of about 0.01-2% w/v, and water.

* * * * *